April 14, 1964 R. C. FOX 3,129,422
OBLIQUE-LOOK RECONNAISSANCE SYSTEM
Filed July 30, 1959 7 Sheets-Sheet 1

WITNESSES
John L. Hensley, Jr.

INVENTOR
Roy C. Fox
BY Maury I. Hull
ATTORNEY

April 14, 1964     R. C. FOX     3,129,422
OBLIQUE-LOOK RECONNAISSANCE SYSTEM
Filed July 30, 1959     7 Sheets-Sheet 3

April 14, 1964  R. C. FOX  3,129,422
OBLIQUE-LOOK RECONNAISSANCE SYSTEM
Filed July 30, 1959  7 Sheets-Sheet 5

United States Patent Office 3,129,422
Patented Apr. 14, 1964

3,129,422
OBLIQUE-LOOK RECONNAISSANCE SYSTEM
Roy C. Fox, Baltimore, Md., assignor to Westinghouse Electric Corporation, East Pittsburgh, Pa., a corporation of Pennsylvania
Filed July 30, 1959, Ser. No. 830,676
19 Claims. (Cl. 343—5)

This invention relates to improvements in active reconnaissance systems carried by aircraft or space vehicles, and more particularly to improved reconnaissance reflected energy systems having radiation patterns at oblique angles to the flight path of the vehicle carrying the reconnaissance apparatus for providing increased resolution for objects and terrain near the ground track of the vehicle, and also to improvements in apparatus for viewing and recording the information obtained by the reconnaissance apparatus.

The invention is described with reference to radar apparatus, but it should be understood that it may use other forms of wave energy.

One well-known type of prior art reconnaissance radar employs a pair of fan-shaped beams directed toward the ground on either side of the ground track of aircraft carrying the reconnaissance radar, the patterns being normally in a substantially vertical plane substantially transverse or perpendicular to the flight path of the aircraft carrying the reconnaissance radar. Such reconnaissance radar systems, however, have the disadvantage that range resolution is exceedingly poor for objects and terrain which are adjacent or near the ground track, the range resolution usually improving as the lateral range increases. Prior art reconnaissance radar employing the above-described radar patterns of radiation also usually has a strip or zone immediately adjacent the ground track of the aircraft on both sides thereof from which, for all practical purposes, no useful information can be obtained, so that in order to obtain complete reconnaissance of a wide strip of terrain, if two aircraft flying parallel paths a preselected distance apart are employed, it is necessary that the reconnaissance pattern of the radar of one aircraft near its outer extremity cover the strip immediately below the other aircraft, and lying on both sides of the ground track of the latter aircraft, and such an arrangement is not economical in the use of radar reconnaissance equipment. If only one aircraft is employed, its passes must overlap this trip, necessitating a greater number of passes to cover a given width of terrain.

The apparatus of the instant invention overcomes these and other disadvantages of the prior art by employing radar apparatus in which the fan-shaped beams on either side of the flight path are directed forward of the aircraft or space vehicle and at oblique angles with respect to the flight path, and also the plane of each beam is at an angle with respect to the plane of the other beam; in effect, the beams of the oblique-look radar system of the instant invention, as compared to the conventional prior art side-look radar heretofore described, are directed forward and rotated about the slanting axis formed by the line between the aircraft and the point in the ground track in advance of the aircraft where the beams strike the ground. In other words, the beams are moved forward from the plane of the aircraft's lateral or Y axis, and the plane of each beam pattern is turned about the aforementioned slanting axis, with the result that the beams of the radar apparatus of the instant invention lie in planes which are at oblique angles with respect to the flight path, are at oblique angles with respect to a plane lying transverse to the flight path, and as aforementioned are also at angles with respect to each other.

This arrangement provides for improved resolution for areas of the terrain lying adjacent the ground track, and also eliminates a strip or area from which no useful information is provided so that, in effect, one aircraft carrying reconnaissance radar apparatus according to the instant invention may effectively provide reconnaissance for a considerably wider strip of terrain than a single aircraft carrying prior art radar reconnaissance apparatus.

Accordingly, a primary object of the instant invention is to provide new and improved radar reconnaissance apparatus.

Another object is to provide new and improved radar reconnaissance apparatus which will provide greater range resolution for portions of the terrain lying below the aircraft and adjacent the ground track of the aircraft carrying the reconnaissance radar.

Another object is to provide new and improved reconnaissance radar apparatus having means for recording the information provided by the radar apparatus and improved means for viewing the information as it is acquired.

Other objects and advantages will become apparent after a study of the following specification, when read in connection with the accompanying drawings, in which.

Figures 1A, 1B, 1C:
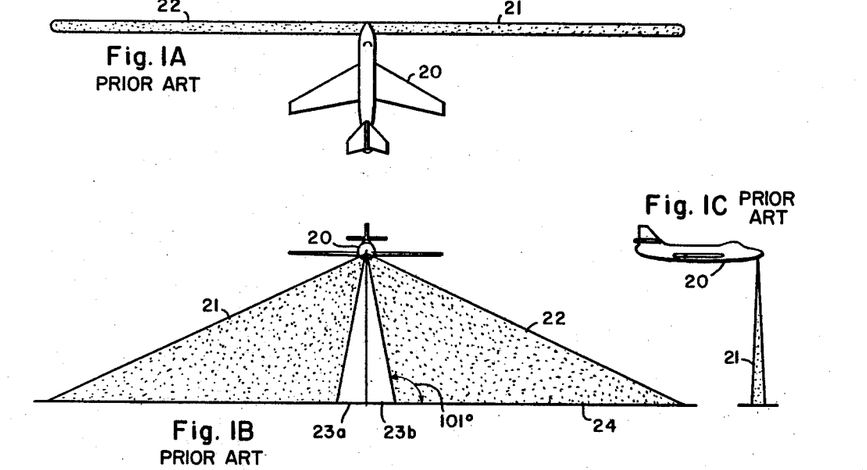
FIGURES 1A, 1B and 1C are plan, front elevation, and side elevation views, respectively, of the patterns of radiation of conventional prior art reconnaissance radar apparatus.

Particular reference should be made now to the drawings, in which like reference numerals are used throughout to designate like parts, for a more detailed understanding of the invention, and in particular to FIG. 1 thereof. The aircraft 20 carries reconnaissance radar apparatus of conventional design for directing a pair of radar beams 21 and 22 which are seen in FIG. 1A to lie in a substantially vertical plane, FIG. 1C providing an additional side view of the beam 21. As the antennas of conventional side-look reconnaissance radar are usually adjusted, the beams 21 and 22 strike the terrain underneath the aircraft at an angle greater than 90° as illustrated in FIG. 1B where the angle shown is approximately 101°, the depression angle at the aircraft being 79°. This results in a strip on the ground on either side of the track of the aircraft carrying the reconnaissance radar from which no useful information is obtainable, such a strip having the two sides thereof designated 23a and 23b in FIG. 1B. The antennas of the reconnaissance radar on aircraft 20 may be adjusted so that the angle between the inner edge of the fan-shaped beam 22 and the ground 24 is substantially 90° eliminating the strip 23, although this practice is unusual and range resolution is not improved thereby.

Figure 2:
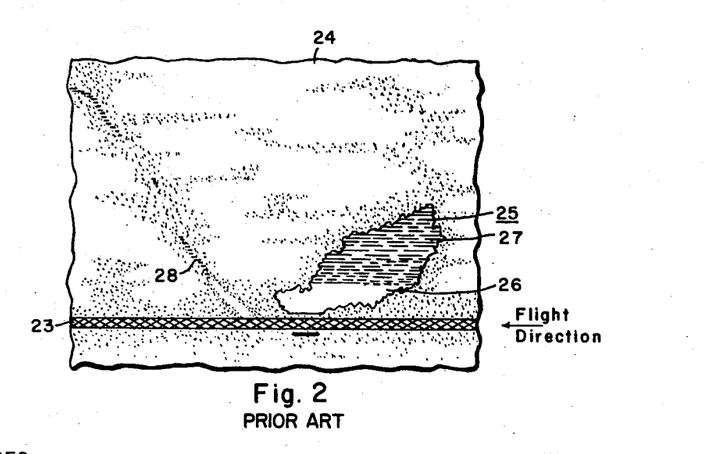
FIG. 2 is a typical view of terrain as obtained by prior art reconnaissance radar apparatus showing the strip or area from which no useful information is obtained and showing that the resolution changes markedly as the lateral range, or distance from the ground track, changes.

Particular attention is directed to FIG. 2, where there is shown a map of a typical ground area lying to one side of the flight path of the aircraft 20, for example, the portion of the ground which is swept by the radar beam 21, FIG. 1A. A small portion of the area swept by beam 22 is also shown. A typical terrain having a river 28 and a lake generally designated 25 therein was chosen, and it is further assumed for purposes of description that the terrain of FIG. 2 is photographically recorded.

A secondary disadvantage of scanning nearly beneath the aircraft is the effect of "reversal" of return experienced as a mirror-like (specular) reflecting surface extends outward from the ground track. For beam incidence angles near vertical, very high reflection of radar (or any other, light, for example) energy occurs thus giving a strong "positive" return. Further out from the ground track the reflected return is beyond the coverage of the antenna and thus little or no return is apparent. Water returns are then "negative." Now water usually stands out by contrast with surrounding terrain either by positive return or negative return, but since it goes through zero there is a region where it will show no contrast with surrounding terrain. This is well illustrated by the river, a bright band, positive return near the ground track, then it loses contrast until it reappears as a negative band about 10% in range out from the ground track. It should be noted that the loss of contrast about 30% out between the two negative regions is for another reason: tree foliage bridging the river. The lake illustrates the same effect. The portion 26 of the lake 25 lying near the ground track reflects considerably more energy to the receiving apparatus on the aircraft than the portion 27 of the lake lying further from the ground track, with the result that the portion of the lake 26 adjacent the track may show up in a relatively overexposed condition on the photographic film, that is, show up as a white area, whereas the portion 27 of the same lake lying further from the ground track may show up as a relatively dark and possibly underexposed area on the film, as illustrated by FIG. 2.

Figure 3:
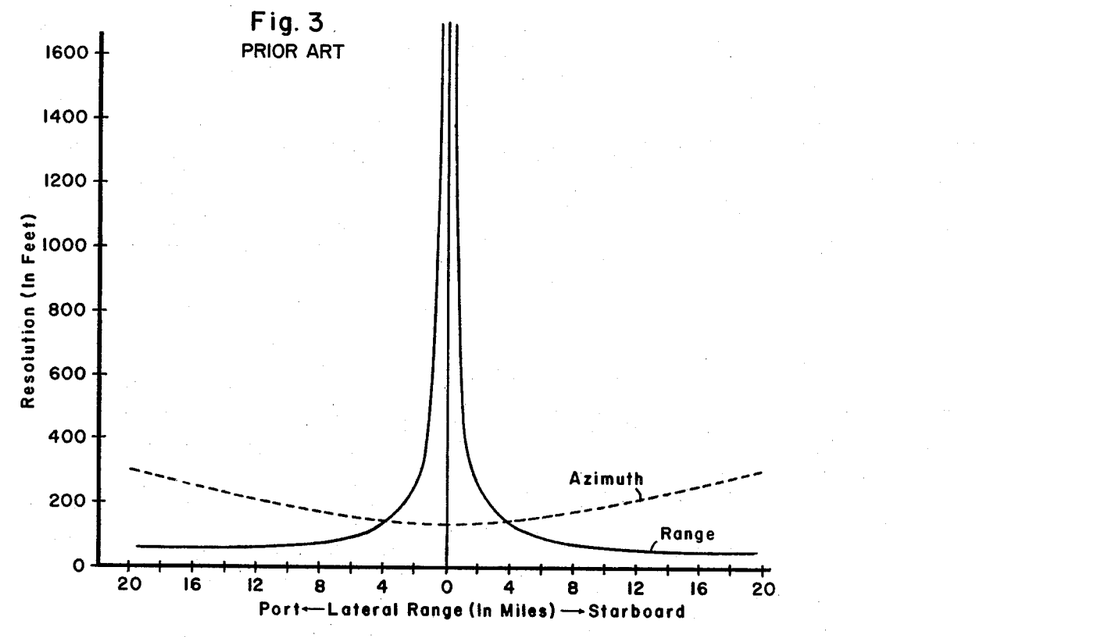
FIG. 3 is a graph showing how the range and azimuth resolution of conventional prior art side-look reconnaissance radar apparatus changes as the lateral range changes.

Particular reference should be made now to FIG. 3, which is a graph illustrating variations in resolution of both range and azimuth with variations in lateral range for reconnaissance radar apparatus having beams oriented as shown in FIGS. 1A, 1B and 1C; that is, having the beams directed in a plane which is substantially perpendicular to the heading of the aircraft and substantially vertical with respect to the ground underneath the aircraft. The curves of FIG. 3 are for typical radar, having a beam width of 8 minutes, a pulse width of 0.1 microsecond, and are for an altitude of 60,000 feet. In FIG. 3, it is noted that range resolution deteriorates from a best range resolution value of approximately sixty feet at a lateral range of, for example, twenty miles, to a range resolution of approximately 1600 feet or more for a lateral range of, for example, one-half mile. The azimuth resolution is best directly underneath the aircraft and deteriorates gradually as shown as the lateral range increases, becoming for the typical apparatus for which the curve of FIG. 3 is drawn about 300 feet at a lateral range of twenty miles.

Figure 4A:
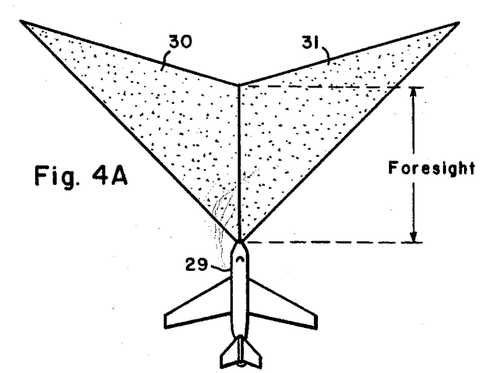
FIGS. 4A, 4B, 4C and 4D are views illustrating the disposition of the oblique radar beams or patterns of radiation according to the instant invention.
Figures 4B, 4C:
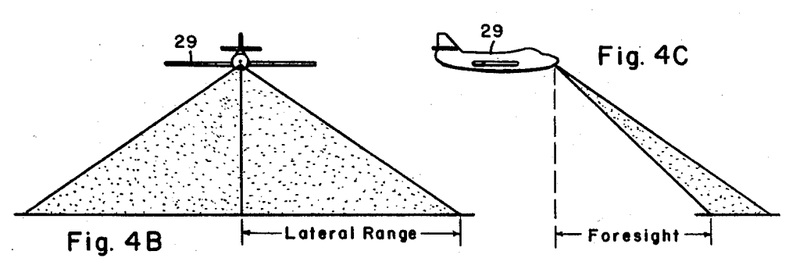

In FIGS. 4A to 4D, inclusive, to which particular attention is directed, views are shown of the patterns of radiation of an oblique-look radar reconnaissance system according to the instant invention. In FIG. 4A, the aircraft 29 carries radar apparatus hereinafter to be more fully described providing two radar beams 30 and 31, which are directed forward from the aircraft at an angle with respect to the vertical as seen in FIG. 4C, the beams striking the terrain ahead of the aircraft at a distance which varies with variations in the altitude of the aircraft, this distance or dimension being called the foresight of the apparatus.

Figure 4D:
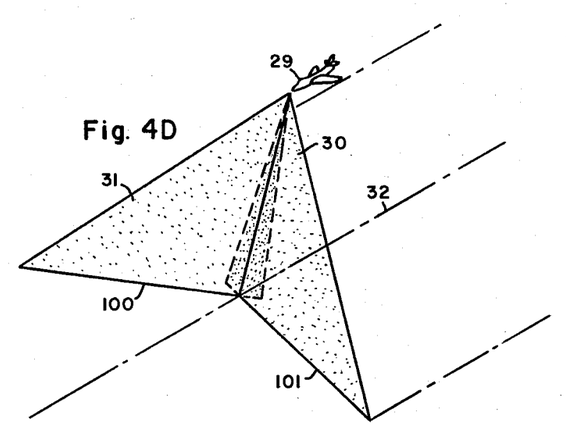

It will be noted in FIG. 4D that the beams 30 and 31 may, if desired, overlap slightly at the aforementioned slanting axis between the aircraft and some future point on the ground track 32 of the aircraft. The effects of this overlap on the indicator or recorder can be eliminated by a time gate set to open at the ground track, as will be readily understood by those skilled in the art.

Figure 7:
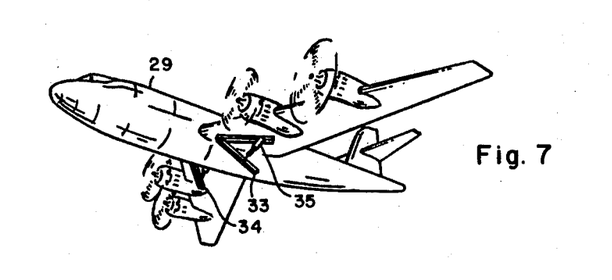
FIG. 7 is a view of antennas mounted on an aircraft for providing patterns of radiation at oblique angles as taught by the instant invention.

Particular reference should be made now to FIG. 7 in which the aircraft 29 is seen to have a pair of antennas 33 and 34 mounted in suitable positions to direct the beams in the desired directions, antenna 33 having mounting means 35. Whereas the particular antenna used constitutes no part of this invention, a suitable antenna arrangement consists of a pair of straight slotted line antenna elements approximately fifteen feet long and mounted along the side of the fuselage of the aircraft 29 or under the wings as shown. If it is desired to achieve an oblique-look arrangement with ten miles foresight, the antenna element is mounted at a 45° angle in the vertical plane and 17° in the horizontal plane, these being suitable values where reconnaissance from an altitude of 60,000 feet is to be made.

If desired, antenna stabilizing apparatus of any convenient design, not shown, may be provided for roll, pitch and yaw correction, or to correct for deviations in flight attitude.

Figure 8:
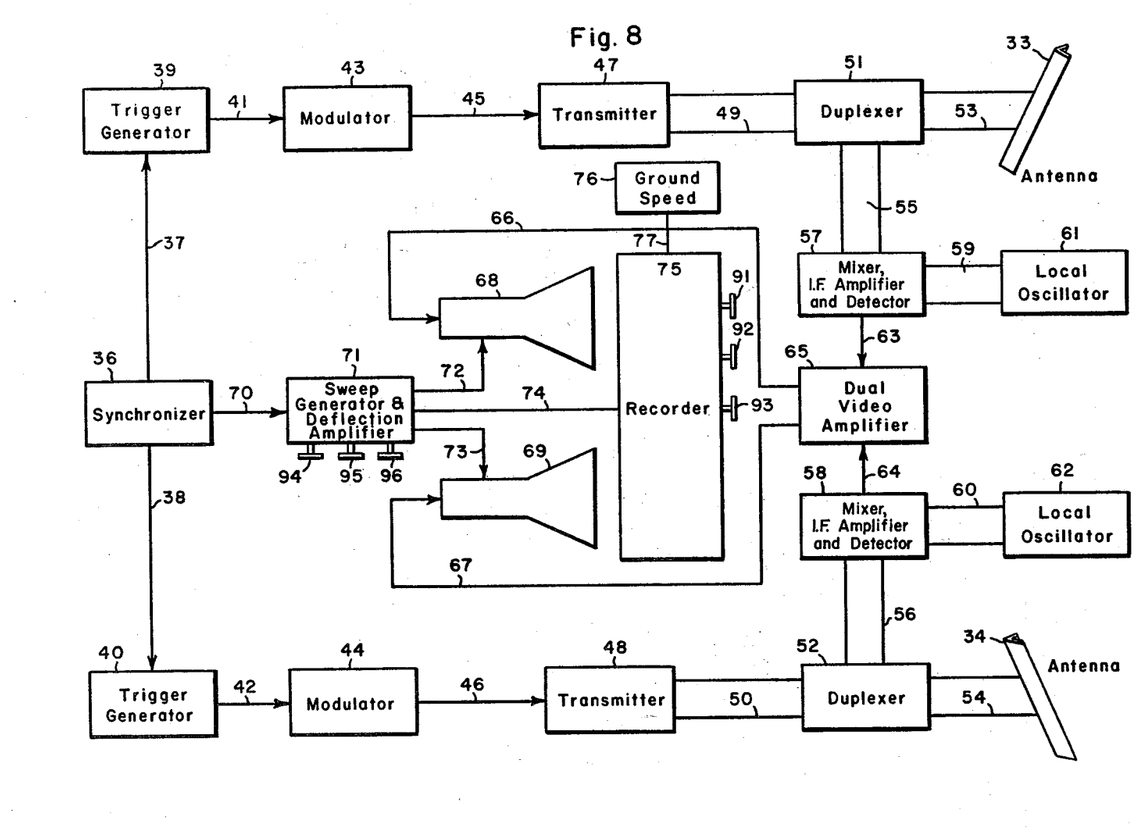
FIG. 8 is an electrical circuit diagram, in block form, of suitable radar apparatus according to one embodiment of the instant invention.
Figure 9:
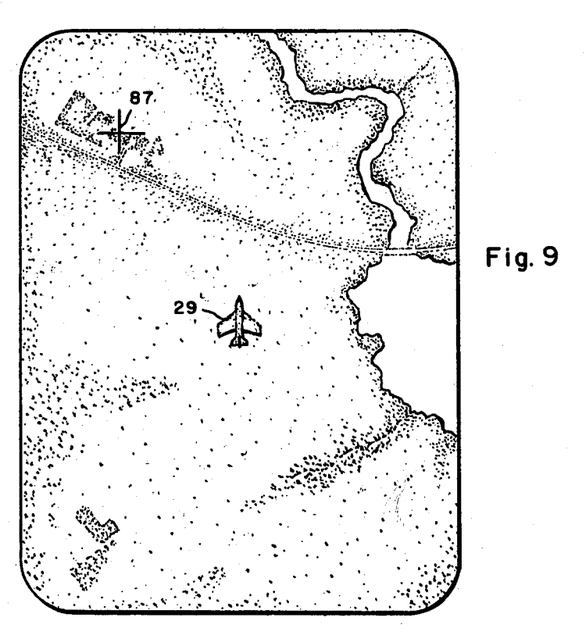
FIG. 9 is a view of terrain as it may be obtained with the apparatus of the instant invention.

Particular reference should be made now to FIG. 8 in which a suitable reconnaissance radar circuit is shown for energizing the aforementioned pair of antennas 33 and 34 and for utilizing echo returns thereto from the terrain on either side of the ground track of the aircraft to provide a map or picture of the terrain such, for example, as that shown in FIG. 9. In the radar circuit of FIG. 8, a synchronizer of any convenient design, shown in block form and designated 36, supplies outputs by conducting means 37 and 38 to a pair of trigger generators 39 and 40, respectively; the outputs of the trigger generators 39 and 40 are applied by conducting means 41 and 42, respectively, to a pair of modulators 43 and 44, respectively, which are operatively connected by conducting means 45 and 46, respectively, to two radar transmitters 47 and 48, respectively, which supply their outputs by way of waveguide or other conducting means 49 and 50, respectively, by way of duplexers 51 and 52, respectively, and waveguide or other conducting means 53 and 54, respectively, to the aforementioned antennas 33 and 34, respectively, for energizing the same and radiating high intensity pulses of radiant energy of preselected frequency, for example, a frequency in the K-band. The pulse width may be, for example, 0.1 microsecond. Transmitters 47 and 48 are operated alternately.

Echo returns from the terrain illuminated by the transmitted radar beams from antennas 33 and 34 are received by the same antennas during the interval that the pulsed transmitters 47 and 48 are not supplying energy, are passed by the waveguides or other conducting means 53 and 54, respectively, to aforementioned duplexers 51 and 52, respectively, which may be of conventional design, whence the received echo pulses are passed by waveguide or other conducting means 55 and 56, respectively, to a pair of mixers, intermediate frequency amplifiers and detectors shown in block form and generally designated 57 and 58, these being, if desired, of conventional design and having applied thereto by waveguide or other conducting means 59 and 60, respectively, signals obtained from a pair of local oscillators of any convenient design shown in block form and generally designated 61 and 62, respectively. The outputs of the aforementioned mixers, intermediate frequency amplifiers and detectors 57 and 58, as will be readily understood by those skilled in the art, may be video pulses, each reflected pulse varying in amplitude over its duration in accordance with the instant amount of energy reflected from the terrain as the wavefront of the transmitted radar pulse arrives at succeeding points along the lines or ground intercepts 100 and 101 on the terrain, FIG. 4D, and these video pulse outputs are applied by conducting means 63 and 64, respectively, to a dual video amplifier which may be of conventional design, shown in block form and designated 65. The amplified pulse outputs of the video amplifier 65 are applied by conducting means 66 and 67 to a pair of cathode ray indicating devices 68 and 69 for intensity modulating the beams thereof, respectively.

The aforementioned synchronizer 36 also supplies an output or outputs by way of conducting means 70 to a sweep generator and deflection amplifier, which may be of conventional design, shown in block form and generally designated 71. The sweep generator and deflection amplifier 71 is constructed and arranged to generate at the proper moments a pair of sweep voltages, which may be of any convenient shape depending upon the type of cathode ray tubes employed at 68 and 69. If, for example, cathode ray tubes 68 and 69 have deflection plates for controlling the deflections of the beams, then the sweep voltages from sweep generator 71 may be sawtooth voltages of conventional shape. If desired, the cathode ray tube means 68 and 69 may employ deflection yokes in which case the sweep voltages from sweep generator 71 will have the conventional wave shape employed in the yoke type of cathode ray tube apparatus.

The recorder 75 comprises means for photographing the recurring traces on tubes 68 and 69 in a manner to provide a photographic view of the terrain.

As hereinbefore stated, the fan-shaped radar beams 30 and 31 of the oblique-look radar apparatus make an angle with respect to each other. This fact must be taken account of in the recording apparatus for providing a true "picture" of the terrain passed over by the aircraft. This can be accomplished by rotating the cathode ray tubes 68 and 69 with respect to each other, assuming that they employ deflection plates, so that the traces lie at an angle with respect to each other substantially corresponding to the angle between ground intercepts 100 and 101, or if the tubes employ deflection yokes the cathode ray tubes 68 and 69 may be mounted in their normal positions and the deflection yokes thereof, which are energized by sweep voltages from sweep generator 71 by way of conducting means 72 and 73, respectively, rotated from their normal positions. The sweep generator and deflection amplifier 71 may also apply an output by way of conducting means 74 to the recorder apparatus shown in block form and generally designated 75. In the instant embodiment of the invention, as aforementioned the recorder 75 employs a moving photographic film, the rate of movement of which may be synchronized with aircraft ground speed obtained from the source 76 and connected to recorder 75 by conducting means 77. The recorder 75 may contain optical means of any convenient design, not shown, for additionally insuring that the two traces on cathode ray tubes 68 and 69 are focused onto the film in recorder 75 so that the inner or adjacent ends of the line traces meet at the desired angle.

It will be readily understood by those skilled in the art that the movement of the film and of the aircraft causes recurrent traces on tubes 68 and 69 to result in the production of closely spaced parallel line traces on the film in recorder 75. For example, when a first pair of pulses of energy are transmitted, the echo returns to antennas 33 and 34 and the sweeps from generator 71 provide line traces on the cathode ray tubes 68 and 69, the beams of these tubes being intensity modulated in accordance with variations in the amplitude of the video pulses on leads 66 and 67, respectively, and the pair of traces are recorded on the film. Before the next transmitted pair of pulses takes place, the aircraft has moved forward or advanced a small distance in its line of flight, and the distance between adjacent lines on the film depends upon the speed of the aircraft, the repetition rate of the transmitted pulses, and the speed of the film, and the next pair of transmitted pulses results in an additional pair of line traces or indications on the tubes 68 and 69, these lines or traces also being of varying brightness or intensity in accordance with instant variations in the amplitudes of the echoes which, in turn, result from variations in reflected energy because of variations in the terrain.

Accordingly, there is provided on the recording film of recorder 75, the film having its speed of movement synchronized with or controlled by the aircraft ground speed in accordance with the desired distance scale along ground track, a large number of very closely spaced parallel line sweeps each of which varies in intensity over its length to provide, in effect, a map of the terrain beneath the aircraft. If desired, the repetition rate of the transmitted pulses may be so high that the same area of the ground is partially swept a number of times and the integrated total effect of a number of sweeps recorded on the film, to thereby provide in some cases sharper detail and a more reliable picture of the terrain which is encompassed by the reconnaissance radar apparatus.

As will be readily understood by those skilled in the art, in order to provide on the photographic film the closest possible simulation of the terrain, it may be desirable to correct for wind drift, and this may be introduced by any convenient means, not shown, for shifting the scope traces, by turning the recording film, or by turning the antenna assembly in line with ground track.

As will be further readily understood by those skilled in the art, it is desirable that one coordinate of the "map" on the photographic film be proportional to ground range normal to ground track, which is called lateral range herein, and the other coordinate be proportional to distance along ground track. To this end, certain navigation inputs may be supplied recorder 75, including ground speed along ground track from source 76. Ground speed along ground track may be computed on the aircraft from air speed, wind velocity, and wind direction, or the two components of ground speed may be derived from a navigation computer.

It will be readily understood that changes in scale along ground track may be provided for by any convenient means, not shown, under the control of 91. Changes in aircraft altitude and in the degree of foresight may be adjusted for, and altitude set-in means 92, and foresight set-in means 93, are provided for the recorder 75. It may be desirable to adjust the sweep also for changes in scale along ground track, changes in altitude, and changes in foresight, and adjustments 94, 95 and 96 are provided for these factors, respectively.

Figure 5A:
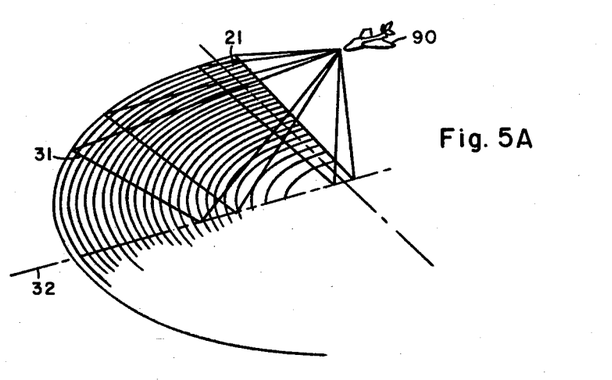
FIGS. 5A, 5B and 5C are diagrammatic views of the terrain and patterns of radiation provided by the apparatus of the instant invention contrasted with the prior art and further illustrate the manner in which improved resolution is obtained.
Figure 5B:
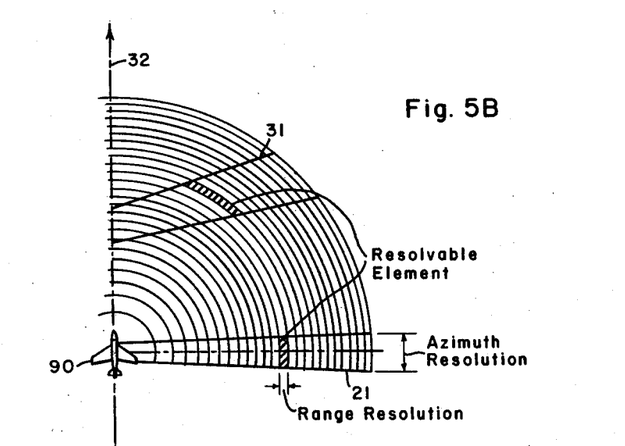

Particular attention should be paid now to FIG. 5B in which there is clearly shown the advantages in resolution obtainable by apparatus constructed according to the present invention. It should be recalled in connection with FIG. 5B that for each pair of pulses of the radar transmitters on the aircraft, radar beams of fan-like shapes are directed toward the earth. In prior art apparatus beams 21 and 22, FIG. 1B, are directed toward the earth and beam 21 strikes the earth first or earliest at a point near the instant location of the aircraft. At succeeding instants the same beam strikes the ground in a substantially straight line or very narrow approximately rectangular area, disregarding for the purposes of explanation, the movement of the aircraft. The result is that an echo of relatively large time duration is reflected back to the receiver apparatus on aircraft 20, the amplitude of the echo varying at any instant in accordance with what portion of the terrain is struck by the radar beam at a particular instant plus the time it took the radar wave to travel back to the receiver apparatus of the aircraft 20. It is well known that the reflection received from various objects varies; for example, there is a wide variation in the reflection received from a body of water and the amount of reflection received from a wooded area of equal size.

Figure 5C:
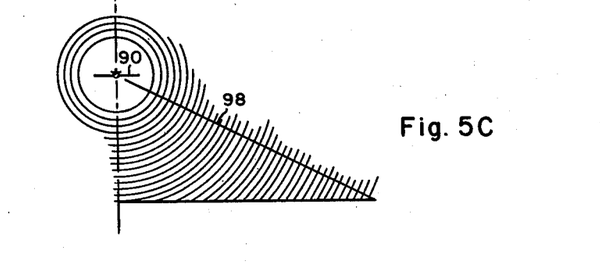
Figure 6:
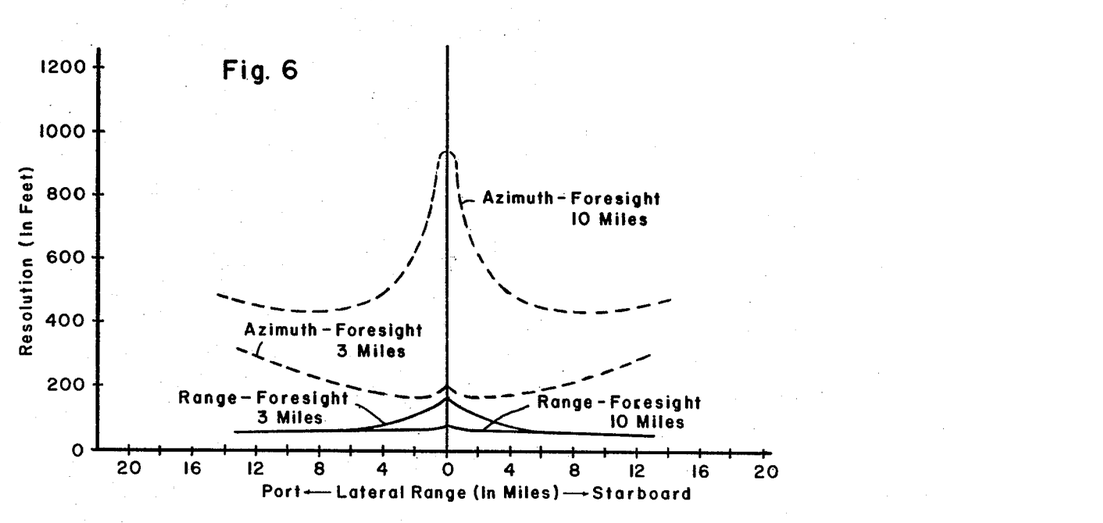
FIG. 6 is a graph showing the improved resolution in range and azimuth obtained by the apparatus of the instant invention.

Assuming a given and constant sensitivity or power in the radar apparatus, the range resolution of reconnaissance radar may be considered a function of the distance the radar beam traverses over the terrain in a given unit of time, and in FIG. 5B it is observed that the concentric circles on the ground having the aircraft 90 for their center are much more widely spaced near the aircraft than they are at a distance from the aircraft, each of the circles representing a uniform radar wave time propagation interval from the next succeeding circle nearer to the aircraft. In FIG. 5C, circles representing the same time intervals are shown uniformly spaced with respect to radial distance along the slant line 98 from their common origin, the aircraft. As aforementioned, the distance between circles at the earth varies considerably, and the largest distance, FIG. 5B, is in the area directly under the aircraft, the distances becoming smaller as the lateral range increases, this also being shown in FIG. 5A. The illustration of FIG. 6 is for an aircraft assumed to be at an altitude of 60,000 feet. It will be readily understood by those skilled in the art that for other altitudes the resolution curves of FIG. 6 would have to be altered and that also if the foresight was changed from the value specified in FIG. 6, that the curves indicating or describing variations in resolution would also be changed.

In FIG. 5A, to which particular attention is directed, it will be noted that where the radar beam is directed forward and at a sufficient great angle, or in other words, where the foresight is sufficiently great, the area underneath the aircraft where the distance between circles is relatively great is not covered by the radar beam 31, with the result that there is much less variation in resolution with variation in lateral range.

Figure 10:
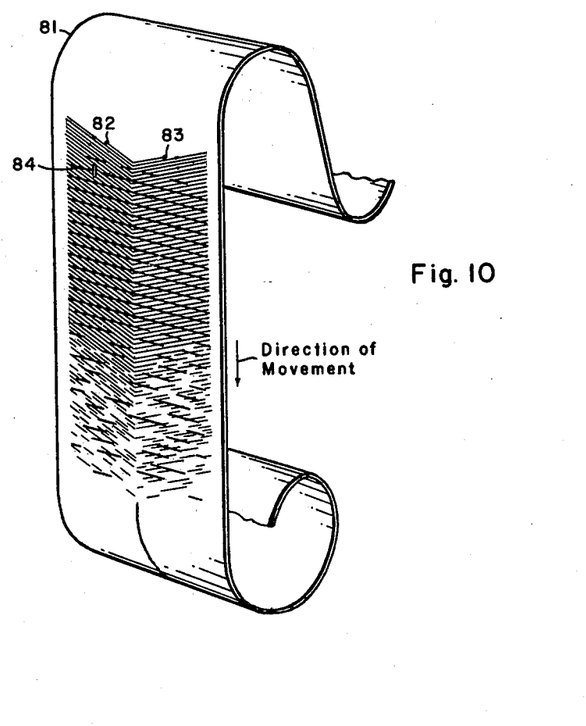
FIG. 10 is a view of a magnetic recording tape as employed in the instant invention, particularly showing the manner in which information is recorded thereon, according to a second embodiment of the invention.
Figure 11:
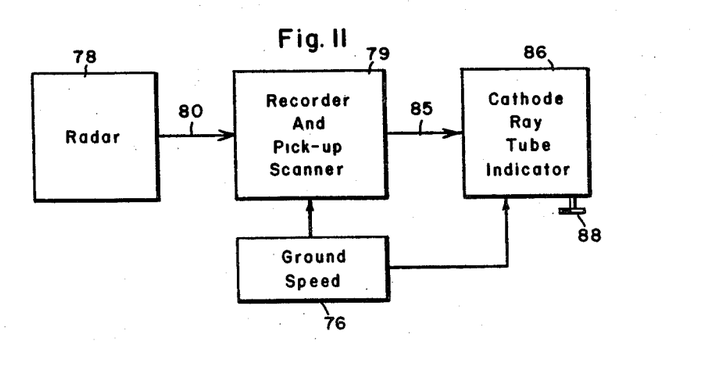
FIG. 11 is an electrical circuit diagram, in block form, of the apparatus for recording on the magnetic tape of FIG. 10 and providing the pilot or other member of the crew with a view of the terrain and a view of the information recorded by the recording apparatus, according to the second embodiment of the invention.

Particular reference should be made now to FIGS. 10 and 11 which together show a second embodiment of the apparatus. The advantages of the second embodiment of FIGS. 10 and 11 is that a person in the aircraft, for example, the pilot or navigator or photointelligence interpreter may see a simulation of the terrain just as it is recorded as the aircraft flies over the terrain. In FIG. 11, the radar apparatus shown in block form and generally designated 78 may be of conventional design and similar to that shown in FIG. 8 with the exception that the recorder and pickup scanner as shown in block form at 79 and energized from radar apparatus 78 by way of conducting means 80, instead of employing film as in the embodiment of FIG. 8, employs a magnetic tape 81, FIG. 10, the movement of the magnetic tape 81 being synchronized with the speed of the aircraft. The radar apparatus and recorder instead of employing cathode ray tubes employs a pair of recording heads 82 and 83, FIG. 10, the movement of which is provided by an convenient means, not shown in FIG. 10, and the movement thereof synchronized with the radar pulses in a manner similar to that of the sweep voltages of generator 71. The echo returns of varying amplitude are applied to the recording heads 82 and 83 to vary the degree of magnetization of the tape 81 as the heads move in straight lines across the tape, the lines being angularly disposed with respect to each other as shown in FIG. 10 at an angle corresponding to the angle between ground intercepts 100 and 101.

A single pickup head 84, FIG. 10, may periodically traverse the entire lateral range distance on both sides of the flight path in one straight line transverse to the direction of movement of the tape, in a plurality of parallel scanning paths, and thereafter return to its original point to repeat the process, to provide for scanning frames. In other words, the pickup head 84 may traverse the entire width of the recorded information on the tape 81 and a predetermined distance along the length, and the output of the pickup scanner 84 is applied by conducting means 85, FIG. 11, to a cathode ray tube indicator 86 constructed and arranged to provide a series of line traces closely adjacent to each other and to have the beam intensity modulated in accordance with variations in the output of the pickup head 84 to thereby provide on the cathode ray tube indicator 86, for the use of the pilot or other crew member, a view of the terrain underneath the reconnaissance aircraft, a picture, for example, similar to that shown in FIG. 9, the picture of FIG. 9 occurring on the screen, not shown, of the cathode ray tube indicator 86. It will be understood that a trace or traces of desired positions and dimensions are provided on the viewing tube of 86. If desired, crosshairs such as those designated 87, FIG. 9, may be inserted electronically in the indicator 86 by control 88 and be superimposed on targets or check points. If desired, the crosshairs may be synchronized with aircraft ground speed with the result that the crosshairs remain stationary with respect to a selected target or check point as the target area moves across the scope face, thus permitting careful and accurate alignment. If desired, computer means, not shown, may be operatively connected to the recorder apparatus 79 and a readout of the crosshair position could be obtained from the computer means in any convenient manner as will be readily understood by those skilled in the art.

There has been provided, then, in the embodiment of FIGS. 10 and 11, apparatus which permits immediate viewing of the terrain by one or more of the crew members of the aircraft carrying the reconnaissance radar. The basic elements of the embodiments of FIGS. 10 and 11 are magnetic recording and cathode ray tube indication as aforementioned, and, in addition to the advantage of immediate viewing capability, there is also the advantage of greater dynamic range and a greater flexibility in data presentation. The picture of the terrain underneath the surveillance aircraft slowly moves across the face of the indicator tube in indicator 86 in a manner corresponding to movement of the terrain beneath the aircraft.

If desired, scaling of direction or distance to targets could be provided by means of engraving on a bezel or face plate to be placed over the indicator, different plates being provided for changes in ground speed, aircraft altitude, and for changes in foresight. If desired also, accurate range marks or range rings could be introduced electronically, as will be readily understood by those skilled in the art.

As previously explained, some advantage is obtained by signal integration in photographically recorded reconnaissance data, that is, by having at least portions of several traces overlap on the same portion of the film. In the instant embodiment, some degree of integration may be obtained by utilizing narrower lines recorded side by side as close as practical without saturating the tape. Preferably, the pickup head is wide enough to bridge many lines, on the order of possibly a hundred or more. Thus, by means of a type of time integration the signal-to-noise ratio may be improved and a better picture obtained at indicator 86. The apparatus of the embodiment of FIGS. 10 and 11 offers the further advantage of increased dynamic range capability. A good radar system under the present state of the art can provide a dynamic range on the order of 60 to 80 decibels. Ordinary film as employed today is limited to a range of approximately seven half tones or approximately 42 decibels, and the cathode ray tube range may be only five half tones or approximately 30 decibels. Thus, where the combination of a cathode ray tube and film is employed, much of the information provided by the radar apparatus itself is lost in the recording. On the other hand, magnetic tape may have a dynamic range capability of 50 to 60 decibels and commercially available TV recording systems easily achieved a 35 decibel range with a resulting improvement in signal-to-noise ratio and improvement in the value of the recorded information.

There is provided, then, in both of the embodiments of the invention shown, apparatus well adapted to accomplish the aforestated objectives of the invention to provide reconnaissance radar apparatus having more uniform resolution in range and azimuth, which will substantially eliminate the dead strip under the flight path which is a characteristic of conventional side-look reconnaissance radar systems. There is further provided reconnaissance radar apparatus in which greater economy in the use of aircraft for transporting the reconnaissance radar apparatus is obtained. For example, a single aircraft flying at an altitude of 60,000 feet with an oblique-look reconnaissance radar system may provide complete information on a strip of terrain approximately 30 miles wide; two aircraft with oblique-look radar flying parallel paths with a two-mile overlap may provide reconnaissance of a strip 58 miles in width, while in conventional side-look radar, two aircraft each with a two-mile gap adjacent its ground track in its coverage provide reconnaissance information of a strip of terrain only 56 miles in width.

Whereas, the radar apparatus has been described as transmitting beams 30 and 31 alternately, it should be understood that they could be of different radio frequencies and transmitted simultaneously. Another method would be to use a single radar switched alternately from one antenna to the other.

Whereas the invention as described calls for arranging the traces on scopes 68 and 69 at angles corresponding to the angles of radar beams 30 and 31, it should be understood that desired angular relationships could be obtained by optical means in recorder 75.

Whereas two specific angular arrangements have been discussed corresponding to foresights of three and ten miles, any number of angular combinations may be used to more properly suit the geometry of the vehicle, airborne, rocket, ballistic, satellite, or other.

The intent is that the oblique scanning principle discussed is an adjunct to velocity scanning techniques whether using radio, sonic or light energy radiation, the antenna or radiating and detecting means being suitably modified for the particular radiation used.

Whereas the invention has been shown and described with respect to some embodiments thereof which give satisfactory results, it should be understood that changes may be made and equivalents substituted without departing from the spirit and scope of the invention.

I claim as my invention:

1. In reconnaissance apparatus adapted to be carried by a vehicle for producing a map of the terrain adjacent the ground track of the vehicle, in combination, means for producing first and second recurrent fan-shaped beams of wave energy directed toward the ground at an area forward of the vehicle, the wave energy beams each being at an oblique angle with respect to the flight path of the vehicle and at an angle with respect to each other, cathode ray tube means including means for producing first and second electron beams and first and second recurrent substantially linear traces, means operatively connected to the cathode ray tube means for utilizing echoes returned from the terrain to intensity modulate the electron beams, each of the traces being intensity modulated over its length in accordance with variations in the amplitude of reflected energy as a fan-shaped wave energy beam arrives at successive points along the terrain, and means disposed adjacent and operatively connected to said cathode ray tube means for recording said first and second traces at an angle with respect to each other corresponding to the angle between the ground intercepts of said first and second fan-shaped wave energy beams, successive recurrences of each trace being recorded as adjacent parallel lines by said recording means to thereby provide a map of the terrain adjacent the ground track of the vehicle.

2. In reconnaissance apparatus, in combination, means for producing first and second recurrent fan-shaped beams of wave energy directed toward the ground from a vehicle carrying the reconnaissance apparatus, said first and second wave energy beams both being directed forward of the vehicle and at oblique angles with respect to the flight path of the vehicle, said first and second wave energy beams being disposed at an angle with respect to each other, first and second cathode ray tube means including first and second electron beam producing means for producing first and second recurrent substantially linear traces disposed at the same angle with respect to each other as the angle at which the ground intercepts of said first and second wave energy beams are disposed with respect to each other, means for intensity modulating the first and second electron beams to provide first and second traces which vary over their lengths in accordance with variations in the amplitude of the received echoes from the terrain as the wave fronts of the first and second wave energy beams arrive at successive points along the ground intercepts at the terrain during individual occurrences of each of the wave energy beams, and photographic means disposed in predetermined position with respect to said first and second cathode ray tube means for photographically recording successive traces of each cathode ray tube means as adjacent parallel lines on moving film to thereby provide a map of the terrain in the area adjacent the ground track of the vehicle as the vehicle moves over the terrain.

3. In reconnaissance apparatus adapted to be carried by a vehicle and to provide a map of the terrain adjacent the ground track of the vehicle, in combination, radiator means mounted in predetermined position on the vehicle, means for energizing said radiator means for producing first and second recurrent fan-shaped beams of radiation, said first and second fan-shaped radiation beams being directed toward the terrain in an area forward of the position of the vehicle, said first and second radiation beams each making an oblique angle with respect to the flight path of the vehicle, said first and second radiation beams also having a predetermined angle therebetween, cathode ray tube means including first and second electron beam producing means for producing first and second recurrent substantially linear traces, means operatively connected to said cathode ray tube means for intensity modulating said first and second electron beams to provide first and second traces which vary along their lengths in accordance with variations in the energy reflected by the terrain as said first and second radiation beams strike successive points along the terrain respectively, and recording means including a moving recording element disposed adjacent and operatively connected to said cathode ray tube means for recording said first and second traces at an angle with respect to each other corresponding to the angle between the ground intercepts of said first and second radiation beams, said recording means having the recording element therein moving at a predetermined rate successive occurrences of each of said first and second traces being recorded as adjacent parallel lines on said moving element to thereby provide a map of the terrain lying on each side of the ground track of said vehicle.

4. In reconnaissance apparatus adapted to be mounted on a vehicle to provide a map of the terrain adjacent the flight path of the vehicle, in combination, radiator means mounted in predetermined position on said vehicle, means for energizing said radiator means for producing first and second recurrent fan-shaped beams of radiation, both said fan-shaped beams of radiation being directed toward the terrain at an area forward of the position of the vehicle, each of said fan-shaped beams lying at an oblique angle with respect to the path of the vehicle, said beams having a predetermined angle between each other, cathode ray tube means including first and second electron beam producing means for providing first and second recurrent substantially linear traces, means for utilizing the returned echoes for intensity modulating said first and second electron beams in accordance with variations in the reflected energy from said first and second radiation beams respectively, said first and second traces being disposed at an angle with respect to each other corresponding to the angle between the ground intercepts of said first and second radiation beams, and photographic means including moving photographic film disposed in predetermined position with respect to said cathode ray tube means for recording successive recurrences of each of said traces as adjacent parallel lines on the film to thereby provide a map of the terrain adjacent the ground track of the vehicle.

5. In reconnaissance radar apparatus adapted to be carried by a vehicle to provide a map of the terrain adjacent the ground track of the vehicle, in combination, radar transmitting means for producing first and second pulsed fan-shaped beams of radiant energy directed toward the terrain at an area forward of the position of the vehicle, each of said radiation beams being disposed at an oblique angle with respect to the flight path of the vehicle and at a predetermined angle with respect to the other beam, first and second receiver means adapted to receive reflected energy from the terrain, cathode ray tube means operatively connected to the transmitter means and including first and second electron beam producing means for producing first and second recurrent substantially linear traces in synchronism with the first and second transmitted pulses respectively, means connected to the first and second receiver means and to the cathode ray tube means for intensity modulating the first and second electron beams in accordance with variations in the intensity of reflected energy received by the first and second receiver means respectively, said first and second traces being disposed at an angle with respect to each other corresponding to the angle between the ground intercepts of said first and second radiation beams, and photographic recording means including moving film means operatively disposed in predetermined position with respect to said cathode ray tube means for recording successive recurrences of each of the first and second traces as adjacent parallel lines on the moving film to thereby provide a picture of the terrain adjacent the ground track of the vehicle.

6. In reconnaissance radar apparatus adapted to be carried on a vehicle for providing a map of the terrain adjacent the ground track of the vehicle, in combination, antenna means mounted in selected position on said vehicle and adapted while energized to produce first and second fan-shaped beams of radiation, radar transmitter means operatively connected to said antenna means for providing pulses of energy thereto to produce the first and second radiation beams, both said beams of radiation being directed toward the ground in an area in advance of the position of the vehicle, each of said radiation beams being disposed at an oblique angle with respect to the flight path of the vehicle, said radiation beams having a predetermined angle therebetween, radar receiver means operatively connected to said antenna means, cathode ray tube means operatively connected to the receiver means and to the transmitter means and constructed and arranged to provide first and second electron beams for first and second recurrent substantially linear traces respectively, the reflected energy intensity modulating said electron beams along the lengths of the traces, and recording means disposed in predetermined position with respect to said cathode ray tube means for recording said first and second traces at an angle on film equal to the angle between the ground intercepts of said first and second radiation beams, said recording means including means for moving said film in accordance with the ground speed of the vehicle whereby successive recurrences of each of the traces are recorded as parallel lines on the moving film to thereby provide a map of the terrain adjacent the ground track of the vehicles.

7. In reconnaissance apparatus adapted to be carried by a vehicle for providing a map of the terrain adjacent the ground track of the vehicle, in combination, means for producing first and second pulsed fan-shaped beams of wave energy, incident upon said terrain in illuminated patterns of the same shape as said beams, said first and second beams of wave energy being directed toward the terrain in an area in advance of the position of the vehicle, each of said first and second wave energy beams lying at an oblique angle with respect to the flight path of the vehicle, said wave energy beams being at a predetermined angle with respect to each other, reflected energy receiving means, and recording means including a moving recording element, means for moving said recording element in accordance with the ground speed of said vehicle, said recording means being operatively connected to said receiving means for producing on said recording element first and second series of adjacent line recordings bearing the same relation to each other as the relation between said illuminated patterns and being intensity modulated over their lengths in accordance with variations in the instantaneous value of reflected energy from said illuminated patterns as the wave energy beams strike successive points on the terrain.

8. In reconnaissance apparatus adapted to be carried by a vehicle for providing a map of the terrain adjacent the ground track of the vehicle, in combination, means on the vehicle for producing first and second fan-shaped recurrent beams of radiant energy, said first and second beams of radiant energy being directed toward the terrain in an area forward of the position of the vehicle, said first and second radiation beams being disposed at oblique angles with respect to the flight path of the vehicle, said first and second radiation beams being disposed at a predetermined angle with respect to each other, recording means including a movable recording medium, means for moving said recording medium in accordance with the ground speed of the vehicle, and means for producing on said recording medium first and second linear recordings at an angle with respect to each other corresponding to the angle between the ground intercepts of said first and second radiation beams, each of the said first and second linear recordings being intensity modulated over its length in accordance with variations in the amount of reflected energy as the first and second radiation beams reach successive points on the terrain, successive occurrences of each of said first and second linear recordings being recorded as adjacent parallel lines on said moving recording medium to thereby provide a map of the terrain adjacent the ground track of the vehicle.

9. In reconnaissance radar apparatus adapted to be carried by a vehicle for providing a map of the terrain adjacent the ground track of the vehicle, in combination, first and second antenna means carried by said vehicle and disposed in predetermined positions thereon, pulse transmitting and receiving means operatively connected to said first and second antenna means for providing first and second pulse recurrent fan-shaped beams of radiation and receiving reflected echoes, said first and second fan-shaped beams of radiation being directed toward the terrain in an area forward of the position of the vehicle, each of said first and second radiation beams being disposed at an oblique angle with respect to the flight path of the vehicle, said first and second radiation beams being disposed at a predetermined angle with respect to each other, and recording means having a moving recording medium therein and being operatively connected to the transmitting and receiving means for producing on the recording medium first and second linear recordings, said first and second linear recordings being disposed at an angle on said moving medium substantially equal to the angle between the ground intercepts of said first and second radiation beams, said moving medium moving at a predetermined speed in accordance with the ground speed of the vehicle and the rate of recurrence of said transmitted pulses, successive echoes from successive transmitted pulses being recorded as adjacent parallel lines on said moving medium to provide a map of the terrain adjacent the ground track of the vehicle.

10. In reconnaissance apparatus adapted to be carried by a vehicle for providing a map of the terrain adjacent the ground track of the vehicle, in combination, means for transmitting first and second recurrent beams of radiant energy, said first and second beams of radiant energy being fan-shaped and directed toward the terrain in an area forward of the position of the vehicle, the ground intercepts of said first and second beams making a predetermined angle with respect to each other, each of said first and second radiation beams recurring at a predetermined rate, means for receiving energy reflected from the terrain as a result of said first and second radiation beams striking the terrain, recording means including a moving recording medium, and means for producing first and second linear recordings on said recording medium, said first and second linear recordings being disposed at an angle thereon substantially equal to the angle between the ground intercepts of said first and second radiation beams, each recurrence of each radiation beam producing an additional linear trace on said recording medium, the traces resulting from the first radiation beam being recorded as adjacent parallel lines on said recording medium and the successive traces resulting from the second radiation beam also being recorded as other adjacent parallel lines on said moving medium to thereby provide a map of the terrain adjacent the ground track of the vehicle.

11. In reconnaissance apparatus adapted to be carried by a vehicle for providing a map of the terrain adjacent the ground track of the vehicle, in combination, means for producing first and second recurrent fan-shaped beams of radiation directed toward the terrain in an area forward of the position of the vehicle, said first and second fan-shaped beams lying at oblique angles with respect to the flight path of the vehicle, said first and second radiation beams having a predetermined angle therebetween, recording means including a moving magnetic tape, and means for producing first and second linear recordings on said magnetic tape, said first and second linear recordings lying at an angle with respect to each other substantially equal to the angle between the ground intercepts of said first and second radiation beams, said first and second linear recordings being intensity modulated over the lengths thereof in accordance with variations in the reflected energy from the first and second radiation beams respectively, successive reflections of the first radiation beam being recorded as adjacent parallel lines on the tape, and successive reflections of the second radiation beam being recorded as other adjacent parallel lines on the tape to thereby provide a map of the terrain adjacent the ground track of the vehicle.

12. In reconnaissance apparatus adapted to be carried by a vehicle for providing a map of the terrain adjacent the ground track of the vehicle, in combination, means mounted in predetermined position on said vehicle for producing first and second recurrent fan-shaped beams of radiant energy, said first and second beams of radiant energy being directed toward an area of the terrain in advance of the position of the vehicle, said first and second radiation beams lying at oblique angles with respect to the flight path of the vehicle, said first and second radiation beams having a predetermined angle therebetween, reflected energy receiving means, and recording means including a moving magnetic tape operatively connected to said reflected energy receiving means for providing first and second linear recordings on said moving tape, said first and second linear recordings being disposed at an angle with respect to each other substantially equal to the angle between the ground intercepts of said first and second radiation beams, said first and second linear recordings being intensity modulated over the lengths thereof in accordance with variations in the amount of reflected energy provided by the first and second radiation beams as the transmitted beams strike successive points along the terrain, successive reflected echoes from the first radiation beam being recorded on the moving tape as adjacent parallel lines, and successive echoes of the second radiation beam being recorded on the moving tape as other adjacent parallel lines to thereby provide a map of the terrain adjacent the ground track of the vehicle.

13. In reconnaissance apparatus adapted to be carried by a vehicle for providing a map of the terrain adjacent the ground track of the vehicle, in combination, radiator means mounted in predetermined position on said vehicle and adapted while energized to produce first and second recurrent fan-shaped beams of radiation directed toward the terrain in an area in advance of the position of the vehicle, said first and second radiation beams lying at oblique angles with respect to the flight path of the vehicle, said first and second beams lying at a predetermined angle with respect to each other, energizing means operatively connected to said radiator means for producing said pulsed first and second radiation beams, receiver means for receiving reflected energy from the first and second radiated beams, recording means including a movable magnetic tape and means for utilizing the reflected energy for producing first and second linear recordings on the tape, said linear recordings being disposed at an angle with respect to each other substantially equal to the angle between the ground intercepts of said radiation beams, said first and second linear recordings varying in intensity over the lengths thereof in accordance with variations in the reflected echoes, successive reflected echoes of the first radiation beam being recorded on the magnetic tape as adjacent parallel lines and successive reflected echoes of the second radiation beam being recorded on the magnetic tape as other adjacent parallel lines, and means for moving said magnetic tape at a selected speed to thereby provide a map of the terrain having a selected scale along a coordinate corresponding to ground track.

14. Reconnaissance apparatus according to claim 11 including in addition cathode ray tube viewing means and scanning means operatively associated with said magnetic tape, said scanning means repeatedly scanning frames consisting of a predetermined number of adjacent lines extending across the entire recorded portion of the magnetic tape, said scanning means and cathode ray tube viewing means providing a visual indication of the information recorded on said magnetic tape.

15. Reconnaissance radar apparatus according to claim 12 including in addition frame scanning pickup means for said moving magnetic tape, and cathode ray tube indicator means operatively connected to said frame scanning pickup means for providing a visual indication of the information recorded on said magnetic tape.

16. Apparatus according to claim 11 including in addition a scanning reading head operatively connected to the magnetic tape, and viewing means connected to the reading head and constructed and arranged to use the signal from the reading head to provide a visual indication of the information about the terrain stored on the magnetic tape.

17. Apparatus according to claim 12 including in addition a scanning reading head for the information recorded on the magnetic tape, and viewing means operatively connected to the reading head.

18. Apparatus according to claim 13 including in addition readout means for the magnetic tape.

19. Apparatus according to claim 12 including in addition readout means for the magnet tape.

References Cited in the file of this patent

UNITED STATES PATENTS

| 2,430,307 | Smith | Nov. 4, 1947 |
| 2,845,620 | Hammond et al. | July 29, 1958 |

FOREIGN PATENTS

| 1,129,502 | France | Sept. 10, 1956 |